United States Patent [19]
Holt

[11] Patent Number: 5,690,814
[45] Date of Patent: Nov. 25, 1997

[54] SPIN-ON FILTER WITH TRANSPARENT CONTAINER PORTION

[75] Inventor: Earl Thomas Holt, Gastonia, N.C.

[73] Assignee: Dana Corporation, Toledo, Ohio

[21] Appl. No.: 597,109

[22] Filed: Feb. 6, 1996

[51] Int. Cl.⁶ .................................................. B01D 35/30
[52] U.S. Cl. ........................ 210/94; 210/232; 210/443; 210/450; 210/DIG. 17
[58] Field of Search .................... 210/94, 440, 443, 210/444, DIG. 17, 95, 232, 450; 220/662, 665; 55/274

[56] References Cited

U.S. PATENT DOCUMENTS

| | | | |
|---|---|---|---|
| 3,297,160 | 1/1967 | Humbert, Jr. | 210/44 |
| 3,939,457 | 2/1976 | Nelson | 55/274 |
| 4,144,168 | 3/1979 | Thornton | 210/440 |
| 4,297,212 | 10/1981 | Padgett, Sr. | 210/168 |
| 4,857,195 | 8/1989 | Brownell et al. | 210/443 |
| 4,992,166 | 2/1991 | Lowsky et al. | 210/130 |
| 5,171,430 | 12/1992 | Beach et al. | 210/94 |
| 5,182,015 | 1/1993 | Lee | 210/94 |
| 5,258,118 | 11/1993 | Gouritin et al. | 210/206 |
| 5,259,953 | 11/1993 | Baracchi et al. | 210/232 |
| 5,507,942 | 4/1996 | Davis | 210/94 |

FOREIGN PATENT DOCUMENTS 998177  7/1965  United Kingdom ........................ 210/94

*Primary Examiner*—Matthew O. Savage
*Attorney, Agent, or Firm*—Millen, White, Zelano & Branigan, P.C.

[57] ABSTRACT

A spin-on filter assembly for filtering engine coolant has a transparent plastic container attached to a cover plate by an annular joint. The annular joint is formed by an annular trough in the cover plate, which annular trough has a lip which overlies a radial flange on the transparent plastic container. A filter element is disposed within the container and is urged by a coil spring against an end plate which abuts the cover plate. The end plate has a threaded central outlet opening and a plurality of spaced inlet openings which are accessed through a recess in the cover plate. The spin-on filter assembly is mounted in the coolant system of an internal combustion engine by a hollow threaded stud.

10 Claims, 2 Drawing Sheets

1

SPIN-ON FILTER WITH TRANSPARENT CONTAINER PORTION

FIELD OF THE INVENTION

The present invention is directed to spin-on filters with transparent container portions. More particularly, the present invention is directed to spin-on filters with transparent container portions made from plastic materials.

BACKGROUND OF THE INVENTION

Liquid filters have been used for many years for filtering liquids such as lubricating oil, fuel and coolant to facilitate operation of internal combustion engines. The filters generally used are referred to as "spin-on" filters in which a filtering media is contained within a disposable metal housing which is attached by an end plate to a mounting base provided on the internal combustion engine. Typically, these filters have an outer metal shell or metal container with an open end which receives the filtering media and a unitary closed end. The filter media is retained within the metal container by the end plate and is biased against the end plate by an axially disposed coil spring. The end plate has an internally threaded central recess which serves as an outlet and includes a plurality of spaced inlets recesses disposed around the threaded outlet recess. The threaded outlet recess is attached to a mounting stud which extends from the mounting base of the engine with which the filter is used. Typically, a thin metal cover plate fits over the end plate and retains the metal container on the end plate. A gasket is usually carried by the cover plate, which gasket surrounds the inlet and outlet recesses to seal the filter assembly with respect to the portion of the engine upon which it is used. Since high hydraulic pressures occur within the container, the container must be relatively strong. Accordingly, it is the general current practice to make the container of steel.

When filtering liquid materials such as engine coolant, the condition of the coolant may be monitored visually in order to determine if the coolant is breaking down or in other ways becoming degraded so as to adversely affect the performance and life of the engine or the cooling system associated therewith. If the filter container is made of a transparent material, then visual monitoring of liquid coolant is greatly facilitated. Accordingly, it is desirable to make the container of glass or plastic. There are numerous drawbacks in making the container of glass such as increased weight and increased expense since glass must be specially fabricated if it is to withstand thermal shock. Transparent plastic materials are now available which are suitable for coolant filter containers; however, in the past, it has been necessary to redesign the end plate, or structure corresponding to the end plate, in order to attach a transparent plastic container. This is, of course, an expensive and somewhat wasteful exercise since production machinery currently installed would have to be drastically modified in order to accommodate plastic filter containers.

In view of these considerations, there is a need for a filter assembly in which a filter media within a transparent container utilizes without extensive modification filter assembly structure which is currently being used.

SUMMARY OF THE INVENTION

The instant invention is directed to a replaceable filter assembly for filtering contaminants from liquids wherein the filter assembly comprises a round metal base plate, an annular metal cover plate, a unitary plastic container for assembly with the base plate, an annular metal cover and cylindrical filter element. The round metal base plate has a threaded central outlet opening which is coaxial with the central axis of the filter and a plurality of inlet openings disposed in spaced relation around the central outlet opening. The round base plate has a circular peripheral edge surface, an inner surface and an outer surface. An annular metal cover plate is in abutment with the outer surface of the base plate. The cover plate has a peripheral trough extending beyond the peripheral edge of the base plate. The peripheral trough is displaced in an axial direction away from the outer surface of the base plate. A cylindrical filter element is disposed proximate the inner surface of the base plate and has a portion thereof urged against the base plate by a coil spring disposed coaxially with the axis. The unitary plastic container has a cylindrical portion with a closed end and an open end. The container fits over the filter element and extends past the peripheral edge of the base plate with the open end of the container being surrounded by an annular flange extending radially outwardly from the open end. The annular flange has a radially extending annular end surface, an axially extending peripheral surface and a radially extending shoulder. The annular flange is received in the trough of the cover plate and is retained therein by a portion of the trough which is deformed thereover.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
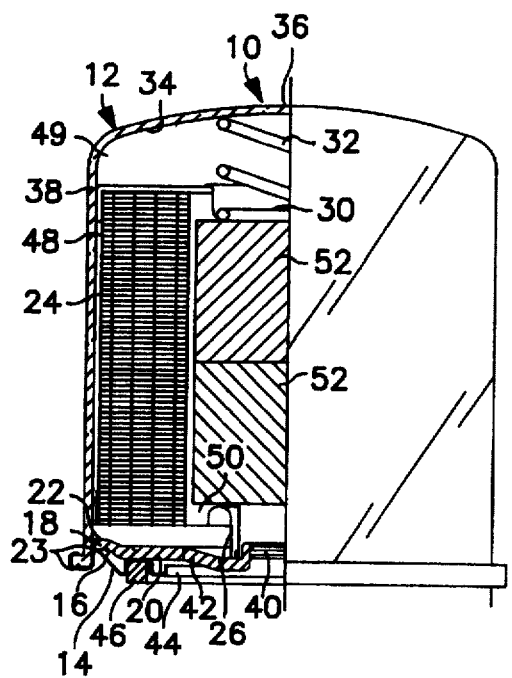
FIG. 1 is a side view, partially in elevation, of a filter assembly for filtering internal combustion engine liquid coolant, the filter assembly being configured in accordance with the principals of the present invention.

Referring now to FIG. 1, there is shown a filter assembly 10 configured in accordance with the principles of the present invention, wherein a transparent filter container 12 is coupled to a cover plate 14 positioned adjacent an outside surface 16 of an end plate 18 which closes an open end 20 of the transparent container. The end plate 18 has an inside surface 22 which is disposed proximate an annular filter media 24 that is supported on the inside surface by an annular metal strut 26. The filter media 24 has a steel end plate 28 with a dished end portion 30 in which is seated a coil spring 32. The coil spring 32 bears against an inner surface 34 of a closed end wall 36 of the container 12 which is unitary with a cylindrical side wall 38 of the container.

The end plate 18 has a threaded central outlet opening 40 for threadable mounting on a threaded inlet stud (not shown) communicating with the coolant system (not shown) of an internal combustion engine (not shown). Radially spaced from the outlet opening 40 are a plurality of spaced inlet openings 42. The outlet opening 40, and inlet openings 42 are inboard of a central opening 44 in the cover plate 14. Outboard of the annular opening 44 is a resilient seal 46 which is disposed in the cover plate 14 and isolates the inlet openings 42 from the surrounding environment when the filter element 10 is "spun-on" to the engine coolant system by threadably engaging the threaded outlet opening 40 with the threaded stud (not shown) on the engine (not shown).

In operation, the coolant flows in through the inlet openings 42 and into an annular space 48 between the filter media 24 and the inner surface of the cylindrical portion 38 of the filter housing 12 as well as into an end space 49 between the filter media and end wall 36 of the filter container. The fluid thereafter passes through the filter media 24 into the hollow central core 50 of the filter media and out through the outlet opening 40. Disposed within the hollow core 50 of the filter media 24 may be additional fluid treatment elements 52 through which the liquid coolant passes as it is filtered and processed in the filter assembly 10. While in the annular space 48 and the end space 49, liquid coolant is visible through the transparent wall of the filter container 12 so that any discolorization or other anomaly is apparent to the person inspecting the coolant system (not shown) of the engine (not shown) with which the coolant system is associated.

Figure 2:
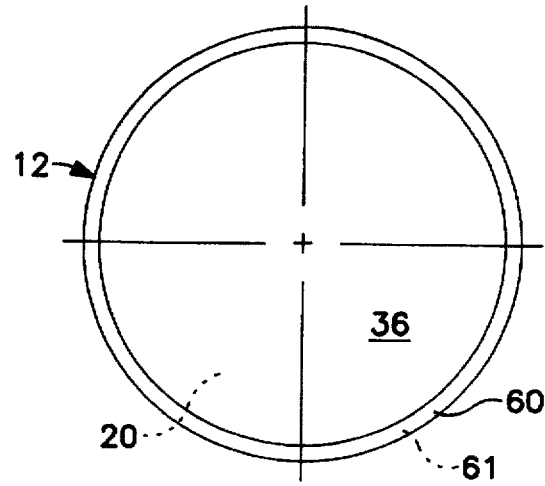
FIG. 2 is a top view of the filter assembly of FIG. 1.

Referring now to FIG. 2 which shows a top view of the filter container, it is seen that the filter container 12 is round or cylindrical with a radially extending annular flange 60 which projects outwardly therefrom at the lower open end 20 of the filter container providing an annular end surface 61 for the filter container. The filter container 12 is made of a transparent plastic material such as Dow ISO-PLAST® 302 clear which can withstand the hydraulic pressure exerted by the liquid coolant within the filter container. Exemplary of appropriate materials are polyester terepthalate, polyester sufone and polyester urethane.

Referring now to generally FIGS. 3–6, it is seen that the cover plated 14, which is preferably a spring steel stamping, has a peripheral trough 62 which receives the radially extending annular flange 60 of the transparent filter container 12. In each case, the trough 62 is formed outboard of a frustoconical portion 64 of the cover 14 and, in each embodiment includes an inner wall 66, an axially extending outer wall 68, a bottom wall 70 and at least one retaining lip 72.

Figure 3:
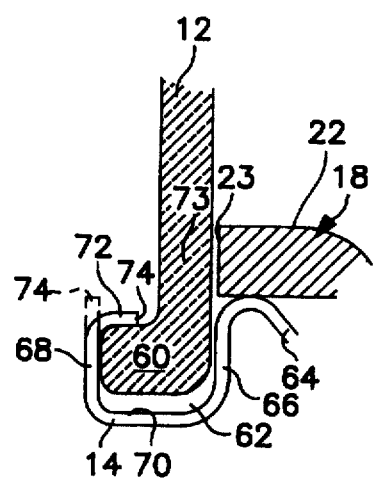
FIG. 3 is an enlarged side elevation of a portion of the filter assembly of FIG. 1, showing a joint coupling transparent filter container to an end plate by using a cover plate.

Referring now to FIG. 3, there is shown a first embodiment 73 of a joint for coupling the transparent container 12 to the filter assembly 10 by retaining the radial flange 60 within the trough 62. In this embodiment, the lip 72 is comprised of a plurality of spaced tangs 74 bent from the outer wall 68, projecting portions 74 of which are shown unbent. In the embodiment of FIG. 3, the container 12 is urged against each retaining lip 72 by the spring 32 pressing against the bottom surface 34 of the unitary end 36 of the transparent container. In the embodiment of FIG. 3, the seal of the joint is accomplished by disposing sealing material in any of the areas where a continuing surface of the transparent container 12 is juxtaposed with a continuous surface of the trough 62 and perhaps even with the peripheral edge 23 of the end plate 18.

Figure 4:
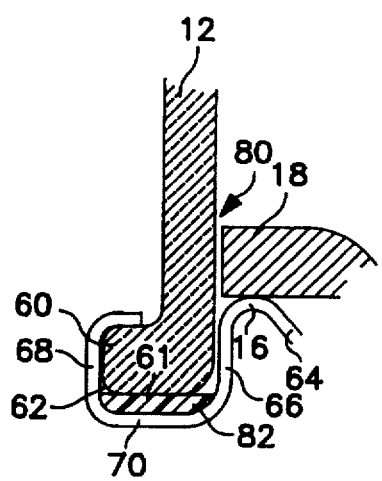
FIG. 4 is a view similar to FIG. 3 showing a second embodiment of the joint.

Referring now to FIG. 4 where a second embodiment 80 of the joint between the transparent container 12 and trough 62 is shown, it is seen that an annular seal comprised of sealing material 82 is disposed in the trough 62 so as to seal between the bottom wall 70 of the trough and the bottom surface 61 of the flange 60, which is also the end surface of the transparent container.

Figure 5:
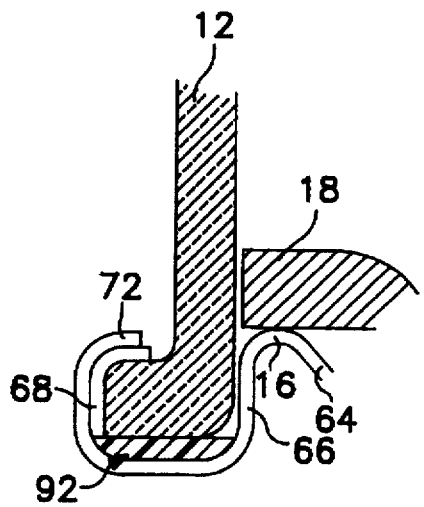
FIG. 5 is a view similar to FIGS. 3 and 4 showing a third embodiment of the joint.

Referring now to FIG. 5 where a third embodiment 90 of the joint is shown, it is seen that an annular seal 92 which is U-shaped in cross section is disposed between the flange 60 and the bottom wall 70, side wall 68 and retaining lip 72 to prevent liquid from inside the transparent container 12 from leaking past the joint 90.

Figure 6:
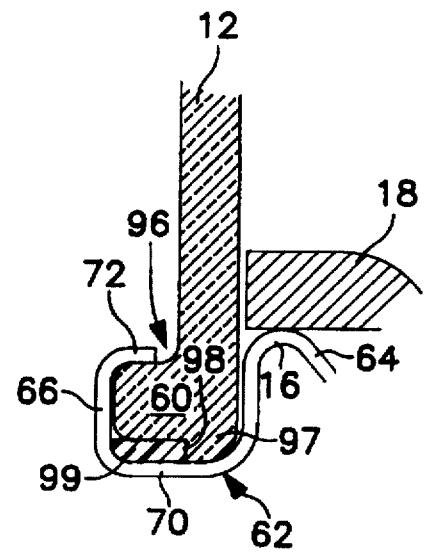
FIG. 6 is a view similar to FIGS. 3–5 showing a fourth embodiment of the joint.

Referring now to FIG. 6 where a fourth embodiment 96 of the joint between the transparent container 12 and the trough 62 is shown, it is seen that the transparent container has a foot 97 which projects past the annular flange 60 to define an annular notch 98 which accommodates an annular seal 99 which seals between the flange 60 and the bottom wall 70 of the trough 62.

Figure 7:
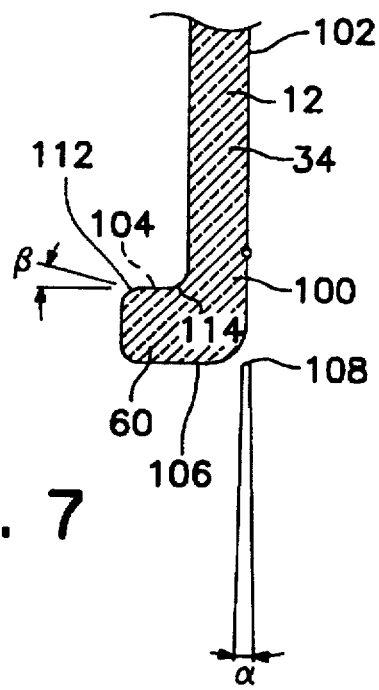
FIG. 7 is an enlarged view of a portion of the container, shown in elevation, and illustrating a first embodiment of a flange configuration at an open end of the transparent container.
Figure 8:
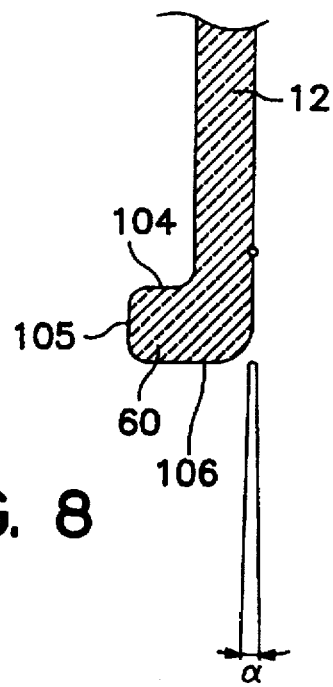
FIG. 8 is a view similar to FIG. 7, but showing a second embodiment of the flange configuration.

Referring now to FIGS. 7 and 8 where details of two embodiments of the annular flange 60 and the adjacent cylindrical portion 34 are shown, the cylindrical portion of the transparent container 12 has a lower end 100 which is offset by an angle $\alpha$ of about 3° with respect to the other portion 102 of the cylindrical wall. This facilitates insertion of the filter media 24 and end plate 18 into the transparent container 12. As is seen in FIG. 7, in order to help retain the lip 74 of the trough 62 (see FIGS. 3–6), the flange 60 may have an upper surface or radially extending shoulder 104 which is at an angle $\beta$ of approximately 15° with respect to the bottom surface or radially extending annular end surface 106 of the radial flange 60. The flange 60 also includes an axially extending peripheral end surface 105. In both FIGS. 7 and 8, the radial flanges 60' and 60 have rounded corners 108, 110 and 112 as well as an arcuate junction 114 between the radial flange 60 and the wall 34. In the embodiment of FIG. 8, the radial flange 60 is similar to its configuration 60' in FIG. 7 except that the upper surface 104 is parallel to the lower surface 106.

By configuring the radial flange 60 of the transparent container 12 as is shown in FIGS. 7 and 8 and retaining the radially flange in the trough 62 as is shown in the embodiments of FIGS. 3–6, the transparent plastic container 12 may be used in place of metal containers without making drastic alterations in the components of the filter assembly 10. Accordingly, the advantages of having a transparent filter container are achieved with minimal expense and with minimal disruption of current fabricating and manufacturing facilities.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A replaceable filter assembly formed about a central axis for filtering contaminants from liquids, the filter assembly comprising:

a round end plate of metal material, the round end plate having a threaded central outlet opening coaxial with the central axis of the filter and a plurality of inlet openings disposed in spaced relation around the central outlet opening, the round end plate having a circular peripheral edge surface, an inner surface facing into the assembly and outer surface facing away from the assembly;

an annular metal cover plate disposed in abutment with the outer surface of the end plate, the cover plate having a peripheral trough extending beyond the peripheral edge of the end plate and displaced in an axial direction away from the outer surface of the end plate;

a cylindrical filter element disposed proximate the inner surface of the end plate and having a portion thereof urged against the end plate by a coil spring disposed coaxially with the central axis; and a transparent unitary plastic container having a cylindrical portion, a closed end and an open end, the container fitting over the filter element and extending past the peripheral edge of the base plate, the open end of the container being surrounded by a unitary annular flange extending radially outwardly from the open end, the annular flange having a radially extending annular end surface, an axially extending peripheral surface and a radially extending shoulder, the annular flange being received in the trough of the cover plate and being retained therein by a portion of the trough deformed thereover.

2. The reusable filter of claim 1, wherein the trough has a first radically extending wall, an axially extending wall and at least one radially extending lip spaced from the first radially extending wall and wherein an annular seal is disposed between the first radially extending wall and the radially extending end surface of the annular flange with the radially extending lip being deformed over the annular flange.

3. The reusable filter of claim 2, wherein the container is made of a material selected from the group consisting of polyester terepthalate, polyester sufone and polyester urethane.

4. The reusable filter assembly of claim 2, wherein the axially extending shoulder of the annular flange is at an acute angle with respect to the central axis.

5. The reusable filter assembly of claim 2, wherein the annular seal is U-shaped in cross section and surrounds the radial flange of the container.

6. The resusable filter assembly of claim 2, wherein there is a depending foot extending in an axial direction from the radially extending annular end surface defining a notch on the radially extending annular end surface, which notch receives the seal.

7. The reusable filter assembly of claim 1, wherein the filter element is comprised of a filter media configured for filtering coolant.

8. The reusable filter assembly of claim 1, wherein the deformed portion of the trough bears against the annular flange of the container to permanently fix the container in non-rotational relationship with respect to the base plate and cover plate.

9. A replaceable filter assembly for filtering contaminants from liquid coolant used to cool an internal combustion engine, the filter assembly comprising:

a round end plate of metal material, the round end plate having a threaded central outlet opening coaxial with a central axis of the filter and a plurality of inlet openings disposed in spaced relation around the central outlet opening, the round end plate having a circular peripheral edge surface, an inner surface facing into the assembly and outer surface facing away from the assembly;

an annular metal cover plate disposed in abutment with the outer surface of the end plate, the cover plate having a peripheral trough extending beyond the peripheral edge of the end plate and displaced in an axial direction away from the outer surface of the end plate;

a cylindrical filter element disposed proximate the inner surface of the end plate and having a portion thereof urged against the end plate by a coil spring disposed coaxially with said central axis;

a transparent unitary plastic container having a cylindrical portion, a closed end and an open end, the container fitting over the filter element and extending past the peripheral edge of the base plate, the open end of the container being surrounded by a unitary annular flange extending radially outwardly from the open end, the annular flange having a radially extending annular end surface, an axially extending peripheral surface and a radially extending shoulder, the annular flange being received in the trough of the cover plate and being retained therein by a portion of the trough deformed thereover; and an annular seal disposed at least between the a first radially extending surface of the trough and the annular end and surface of the annular flange.

10. The reusable filter of claim 9, wherein the container is made of a material selected from the group consisting of polyester terepthalate, polyester sufone and polyester urethane.

* * * * *